(12) United States Patent
Vermani et al.

(10) Patent No.: US 8,831,668 B2
(45) Date of Patent: Sep. 9, 2014

(54) POWER CONTROL FOR TV WHITE SPACE DEVICES

(75) Inventors: Sameer Vermani, San Diego, CA (US);
Rahul Tandra, San Diego, CA (US);
Santosh Paul Abraham, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 13/290,864

(22) Filed: Nov. 7, 2011

(65) Prior Publication Data

US 2012/0115536 A1    May 10, 2012

Related U.S. Application Data

(60) Provisional application No. 61/411,354, filed on Nov. 8, 2010.

(51) Int. Cl.
*H04B 7/00*    (2006.01)
*H04W 52/08*   (2009.01)
*H04W 52/36*   (2009.01)
*H04W 52/22*   (2009.01)

(52) U.S. Cl.
CPC ............ *H04W 52/08* (2013.01); *H04W 52/365* (2013.01); *H04W 52/367* (2013.01); *H04W 52/228* (2013.01)
USPC ........................................................ 455/522

(58) Field of Classification Search
None
See application file for complete search history.

(56) References Cited

U.S. PATENT DOCUMENTS

| 7,539,507 | B2 | 5/2009 | Grob et al. |
| 2009/0047916 | A1 | 2/2009 | Haykin |
| 2009/0197627 | A1 | 8/2009 | Kuffner et al. |
| 2010/0046479 | A1 | 2/2010 | Sampath et al. |
| 2010/0046656 | A1* | 2/2010 | van Nee et al. ............... 375/267 |

(Continued)

FOREIGN PATENT DOCUMENTS

| JP | 2008529444 A | 7/2008 |
| WO | WO-2005053253 | 6/2005 |

(Continued)

OTHER PUBLICATIONS

Doppler K et al., "Device-to-Device Communications; Functional Prospects for LTE-Advanced Networks", Communications Workshops, 2009. ICC Workshops 2009. IEEE International Conference on, IEEE, Piscataway, NJ, USA, Jun. 14, 2009, pp. 1-6, XP031515460, ISBN: 978-1-4244-3437-4 abstract, chapters II, III.

(Continued)

*Primary Examiner* — Ed Urban
*Assistant Examiner* — Mohammed Rachedine
(74) *Attorney, Agent, or Firm* — Patterson & Sheridan, L.L.P.

(57) ABSTRACT

Certain aspects of the present disclosure provide techniques and apparatus for using power control in a television white space (TVWS) network. One example method generally includes generating, at a first apparatus, a message for controlling a transmit power of a second apparatus—the message including a first indication of a first transmitter power backoff for the first apparatus and a second indication of a second transmitter power backoff for the second apparatus—and transmitting, to the second apparatus, the message based on the first transmitter power backoff. In this manner, messaging may be used to enable transmit power control of devices in a TVWS network, which may operate in accordance with the IEEE 802.11af standard.

25 Claims, 5 Drawing Sheets

(56) References Cited

U.S. PATENT DOCUMENTS

| | | |
|---|---|---|
| 2010/0080173 A1* | 4/2010 | Takagi .................. 370/328 |
| 2011/0028179 A1 | 2/2011 | Sawai et al. |
| 2011/0086664 A1 | 4/2011 | Li et al. |
| 2011/0194542 A1 | 8/2011 | Kim et al. |

FOREIGN PATENT DOCUMENTS

| WO | WO-2006104348 A1 | 10/2006 |
| WO | WO2009009549 | 1/2009 |
| WO | WO 2009009549 A2 * | 1/2009 |
| WO | WO2009118367 A2 | 10/2009 |
| WO | WO-2010021950 A1 | 2/2010 |

OTHER PUBLICATIONS

International Search Report and Written Opinion—PCT/US2011/059798—ISA/EPO—Jan. 24, 2012.
Sang Yun Lee et al: "Area spectrum efficiency of TV White Space wireless system with transmit power control" Advanced Communication Technology (ICACT), 2010 The 12th International Conference on, IEEE, Piscataway, NJ, USA, Feb. 7, 2010, pp. 1061-1066, XP031653742, ISBN: 978-1-42445427-3.

* cited by examiner

US 8,831,668 B2

POWER CONTROL FOR TV WHITE SPACE DEVICES

CROSS-REFERENCE TO RELATED APPLICATIONS

This application claims benefit of U.S. Provisional Patent Application Ser. No. 61/411,354, entitled "Power Control for TV White Space Devices" and filed Nov. 8, 2010, which is herein incorporated by reference.

BACKGROUND

1. Field

Certain aspects of the present disclosure generally relate to wireless communications and, more particularly, to using power control in a television white space (TVWS) network.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements demanded for wireless communications systems, different schemes are being developed. One scheme known as "white-fi" entails expanding Wi-Fi technology with the unused frequency spectrum in the television (TV) band (i.e., the TV white space). An Institute of Electrical and Electronics Engineers (IEEE) 802.11af task group has been created to define an amendment to the IEEE 802.11 standard for using the TV white space (TVWS). The IEEE 802.11 denotes a set of Wireless Local Area Network (WLAN) air interface standards developed by the IEEE 802.11 committee for short-range communications (e.g., tens of meters to a few hundred meters). However, by using the TVWS with frequencies below 1 GHz, IEEE 802.11af may offer greater propagation distances to be achieved, in addition to the increased bandwidth offered by the unused frequencies in the TV spectrum.

SUMMARY

Certain aspects of the present disclosure generally relate to power control for television white space (TVWS) devices.

Certain aspects of the present disclosure provide a first apparatus for wireless communications. The first apparatus generally includes a processing system configured to generate a message for controlling a transmit power of a second apparatus—the message including a first indication of a first transmitter power backoff for the first apparatus and a second indication of a second transmitter power backoff for the second apparatus—and a transmitter configured to transmit, to the second apparatus, the message based on the first transmitter power backoff.

Certain aspects of the present disclosure provide a method for wireless communications. The method generally includes generating, at a first apparatus, a message for controlling a transmit power of a second apparatus—the message including a first indication of a first transmitter power backoff for the first apparatus and a second indication of a second transmitter power backoff for the second apparatus—and transmitting, to the second apparatus, the message based on the first transmitter power backoff.

Certain aspects of the present disclosure provide a first apparatus for wireless communications. The first apparatus generally includes means for generating a message for controlling a transmit power of a second apparatus—the message including a first indication of a first transmitter power backoff for the first apparatus and a second indication of a second transmitter power backoff for the second apparatus—and means for transmitting, to the second apparatus, the message based on the first transmitter power backoff.

Certain aspects of the present disclosure provide a computer-program product for wireless communications. The computer-program product generally includes a computer-readable medium having instructions executable to generate, at a first apparatus, a message for controlling a transmit power of a second apparatus—the message including a first indication of a first transmitter power backoff for the first apparatus and a second indication of a second transmitter power backoff for the second apparatus—and transmit, to the second apparatus, the message based on the first transmitter power backoff.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
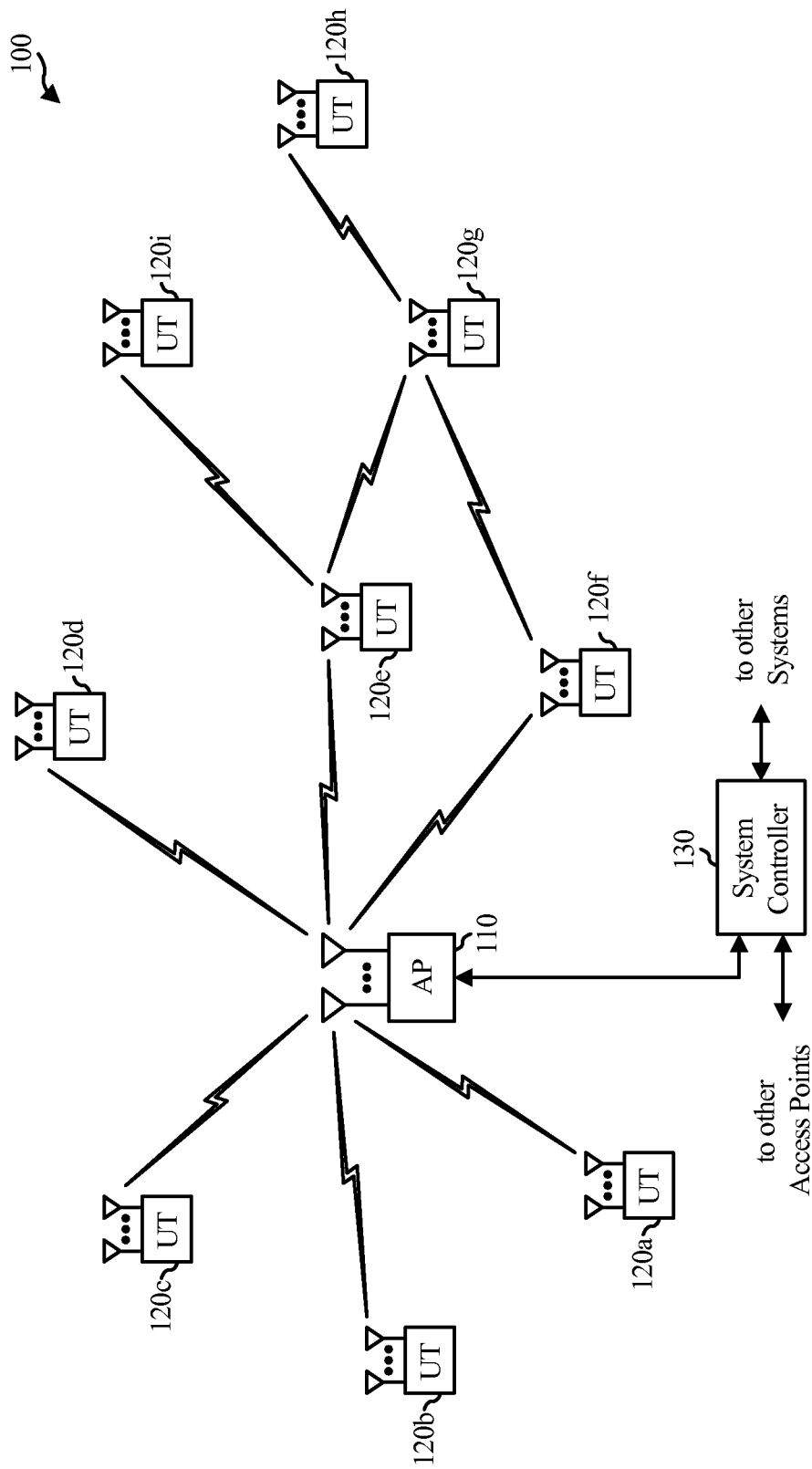
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communications System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal, a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), a tablet, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency, or time by some means. K may be greater than $N_{ap}$ if the data symbol streams can be multiplexed using TDMA techniques, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to a different user terminal 120.

Figure 2:
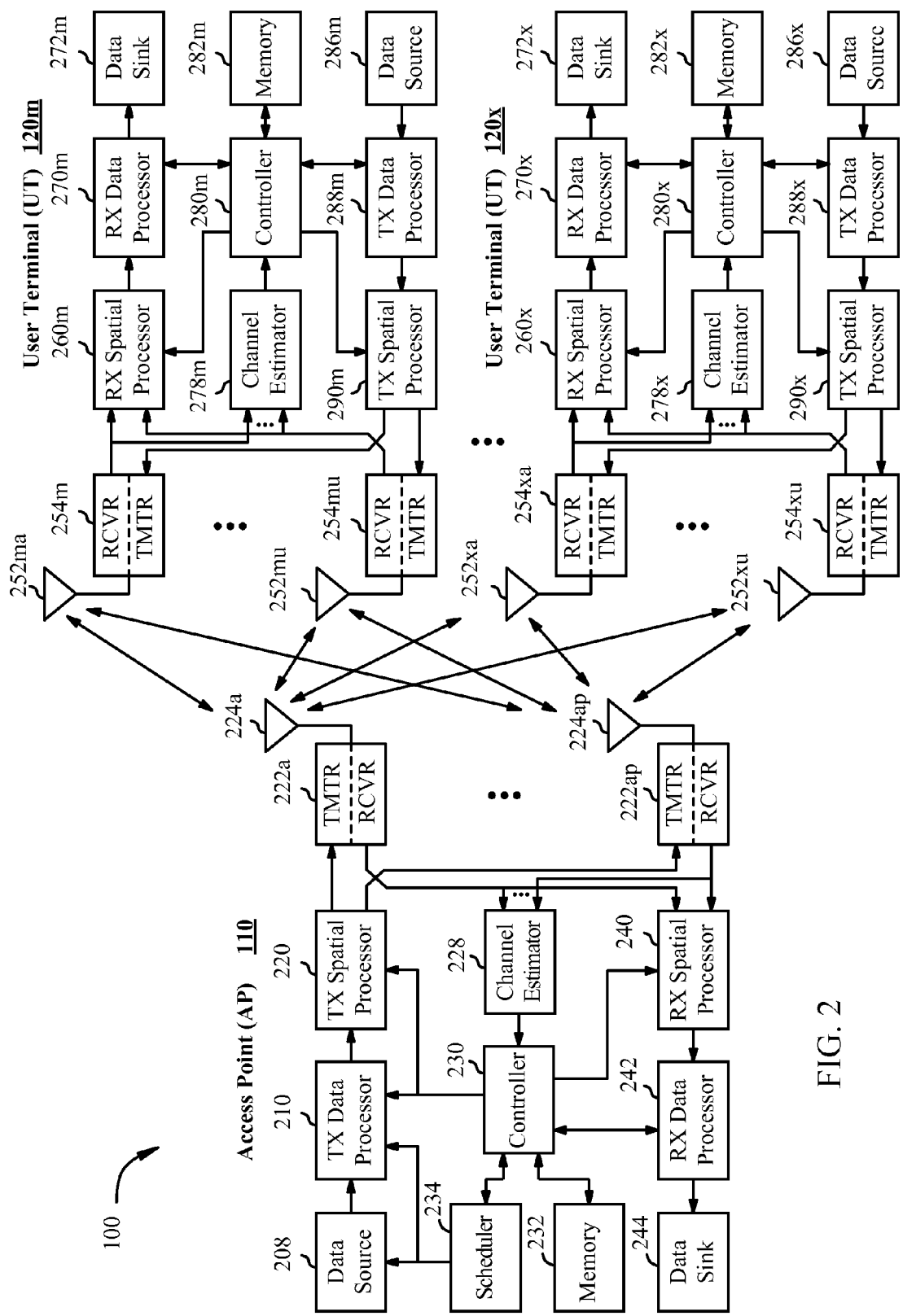
FIG. 2 illustrates a block diagram of an example access point and user terminals in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance, and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Example Power Control for TVWS Devices

Recent rulings for utilizing the television white space (TVWS) have mandated that all TV band devices (TVBDs) shall incorporate transmit power control to limit their operating power to the minimum necessary for successful communication. A description of the power control feature mechanism should be included when submitting for equipment certification. Although successful communication is not defined precisely in the ruling, some assumptions can be made about the meaning of successful communication. For example, the Federal Communications Commission (FCC) would likely not want to mandate less spectral efficiency, and therefore, successful communication may entail enough power for the most complex modulation and coding scheme (MCS) with the highest data rate to go through.

Figure 3:
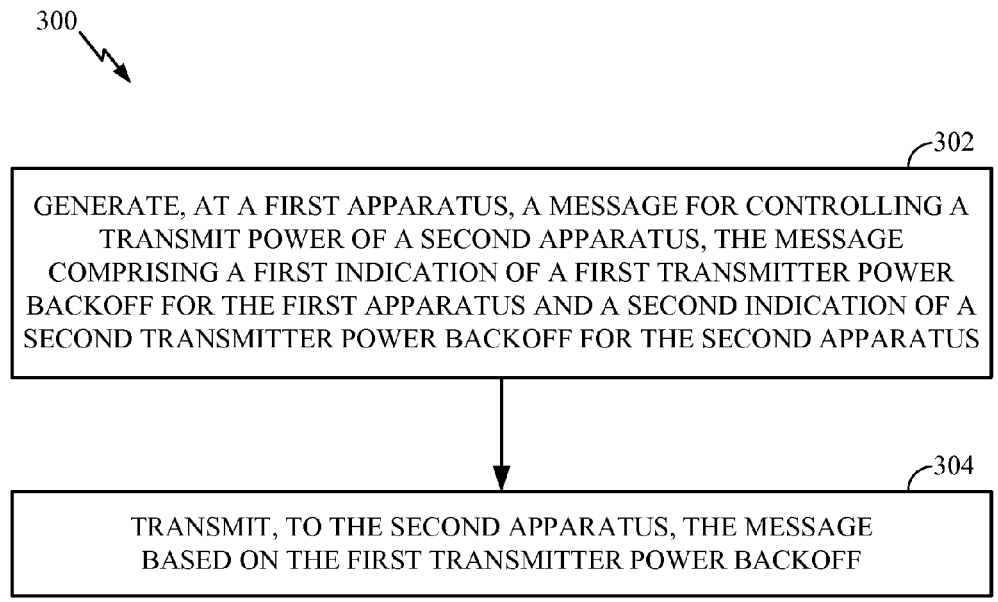
FIG. 3 illustrates example operations using power control, from the perspective of an access point (AP) or a station (STA) for example, in accordance with certain aspects of the present disclosure.

FIG. 3 illustrates example operations 300 for using power control, from the perspective of a first apparatus such an access point (AP), a user terminal, or any suitable station (STA). The operations 300 may begin, at 302, by generating, at the first apparatus, a message for controlling a transmit power of a second apparatus. The message may comprise a first indication of a first transmitter power backoff for the first apparatus and a second indication of a second transmitter power backoff for the second apparatus. At 304, the first apparatus may transmit, to the second apparatus, the message based on the first transmitter power backoff.

For certain aspects, the operations may further comprise receiving another message for controlling the transmit power of the first apparatus. The other message may comprise a third indication of a third transmitter power backoff for the second apparatus and the first indication of the first transmitter power backoff for the first apparatus. The first apparatus may determine the second transmitter power backoff for the second apparatus based on the third transmitter power backoff. For certain aspects, determining the second transmitter power backoff may comprise: (1) determining a power of the received other message ($P_{received}$) and a noise floor (NoiseFloor) for the second apparatus; and (2) calculating the second transmitter power backoff ($B_{new}$) as $B_{new}=P_{received}-(\text{NoiseFloor}+SNR_{target})+B_{current}$, wherein $SNR_{target}$ is a target signal-to-noise ratio for the wireless communications and $B_{current}$ is the third transmitter power backoff.

Figure 4:
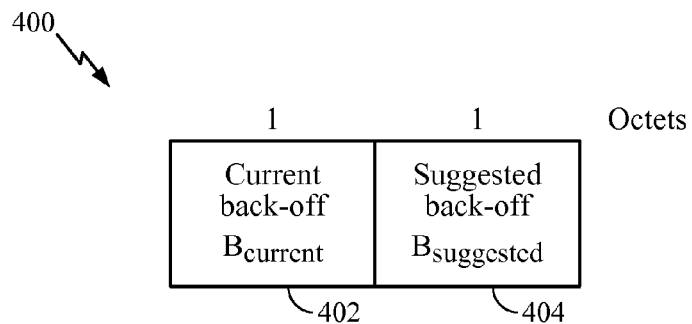
FIG. 4 illustrates an example power control frame, in accordance with certain aspects of the present disclosure.

FIG. 4 illustrates an example power control frame 400, in accordance with certain aspects of the present disclosure. The power control frame 400 may comprise a current backoff field 402, which may indicate a current transmitter power backoff ($B_{current}$). $B_{current}$ may be expressed using one octet (i.e., eight bits), for example. Following the current backoff field 402, the power control frame 400 may comprise a suggested backoff field 404, which may indicate a suggested power backoff ($B_{suggested}$) to a receiver intended to receive the transmission. $B_{suggested}$ may also be expressed using one octet, for example. For certain aspects, the power control frame 400 may be present in every packet transmitted between two stations, such as STA1 and STA2.

Figure 5:
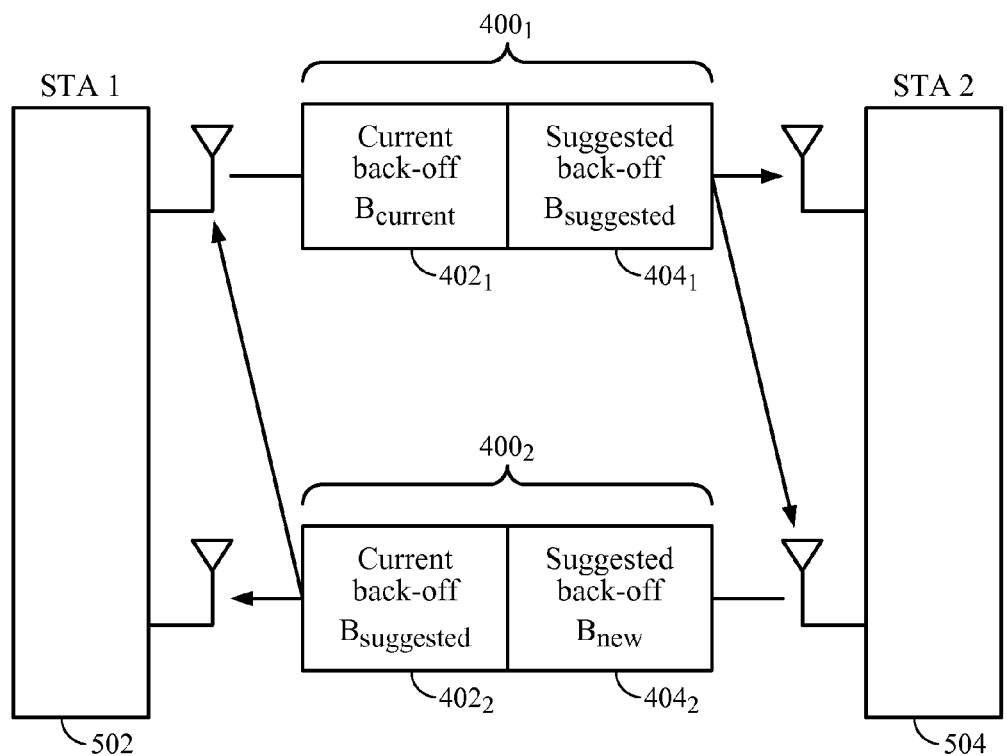
FIG. 5 illustrates an example exchange of power control frames between two wireless entities, in accordance with certain aspects of the present disclosure.

FIG. 5 illustrates an example exchange 500 of power control frames between two wireless entities 502, 504 (labeled STA1 and STA2), in accordance with certain aspects of the present disclosure. The two wireless entities may comprise an access point 110 and a user terminal 120 for certain aspects or two user terminals 120 communicating in a peer-to-peer fashion for other aspects.

First, STA1 may send a power control frame $400_1$ with an indication of the current transmitter power backoff ($B_{current}$) for STA1 in the current backoff field $402_1$ and an indication of the suggested power backoff ($B_{suggested}$) for STA2 in the suggested backoff field $404_1$. Certain communications (e.g., the first communication) between a pair of STAs may use $B_{current}=0$ and $B_{suggested}=0$, indicating that a power backoff is neither being used nor is suggested, respectively, for this (first) exchange. For certain aspects, the first communication may comprise a request-to-send (RTS)/CTS (clear-to-send) frame exchange between STA1 and STA2.

Upon receiving the power control frame $400_1$, STA2 may compute a power backoff ($B_{new}$) to achieve a certain target signal-to-noise ratio ($SNR_{target}$). Based on the received power ($P_{received}$) of the packet from STA1 (e.g., an RTS message) and the current backoff ($B_{current}$), the new power backoff ($B_{new}$) may be determined according to the following equation:

$$B_{new}=P_{received}-(\text{NoiseFloor}+SNR_{target})+B_{current} \quad \text{Equation (1)}$$

where NoiseFloor is a measure of the thermal noise in decibels (dB) and $SNR_{target}$ allows the most complex modulation and coding scheme (MCS) with the highest data rate to go through (which is assumed to be same for all STAs).

After determining $B_{new}$, STA2 then communicates $B_{new}$ to STA1 via a power control frame $400_2$ in a packet, which may be transmitted with a transmission power equal to $P_{max}-B_{suggested}$. The power control frame $400_2$ may comprise an indication of $B_{suggested}$ in the current backoff field $402_2$ and an indication of $B_{new}$ in the suggested backoff field $404_2$. Subsequent packets from STA1 to STA2 may be transmitted using a transmission power equal to $P_{max}$ minus the value in the suggested backoff field $404_2$ received from STA2 (=the latest $B_{new}$ received from STA2), such that the current backoff field $402_1$ may include an indication of this current transmitter power backoff ($B_{current}$ of STA1=$B_{new}$ received from STA2).

Figure 6:
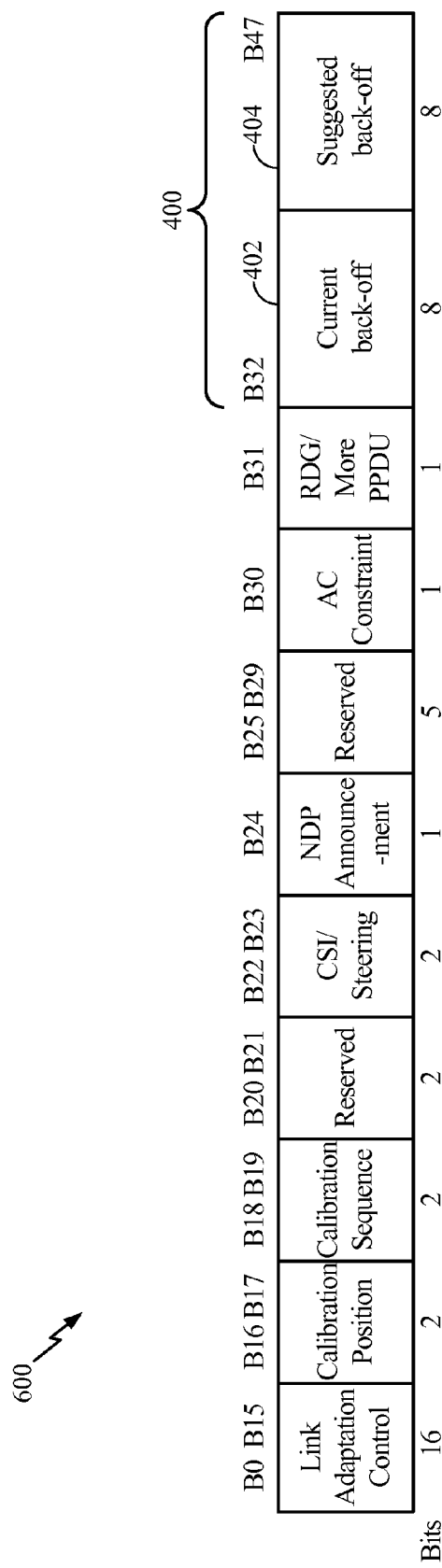
FIG. 6 illustrates an example High Throughput (HT) control field with the power control frame of FIG. 4 either included in or following the HT control field, in accordance with certain aspects of the present disclosure.

As for the frame format for power control, an order bit in a frame control field may be reused for power control, especially since there currently are no legacy devices in TV white space networks. FIG. 6 illustrates an example High Throughput (HT) control field 600 with the power control frame 400 of FIG. 4 either following or included in the HT control field as two different options. For the first option, the order bit may be set equal to 1 (or to 0 for other aspects), and a reserved bit in the HT control field 600 may be used, which when set to 1 (or to 0 for other aspects) indicates that the 2 subsequent bytes following the HT control field 600 contain the power control information. In this first option, the power control frame 400 is not part of the 4-byte HT control field 600, but is simply transmitted immediately following the HT control field.

As a second option, the size of the HT control field 600 may be increased (i.e., by adding 2 additional bytes) to incorporate the power control frame 400 within the HT control field. Setting the order bit equal to 1 (or to 0 for other aspects) in the HT control field may then indicate the existence of a 6-byte IEEE 802.11af control field with 2 additional bytes added to the IEEE 802.11n HT control field.

Figure 3A:
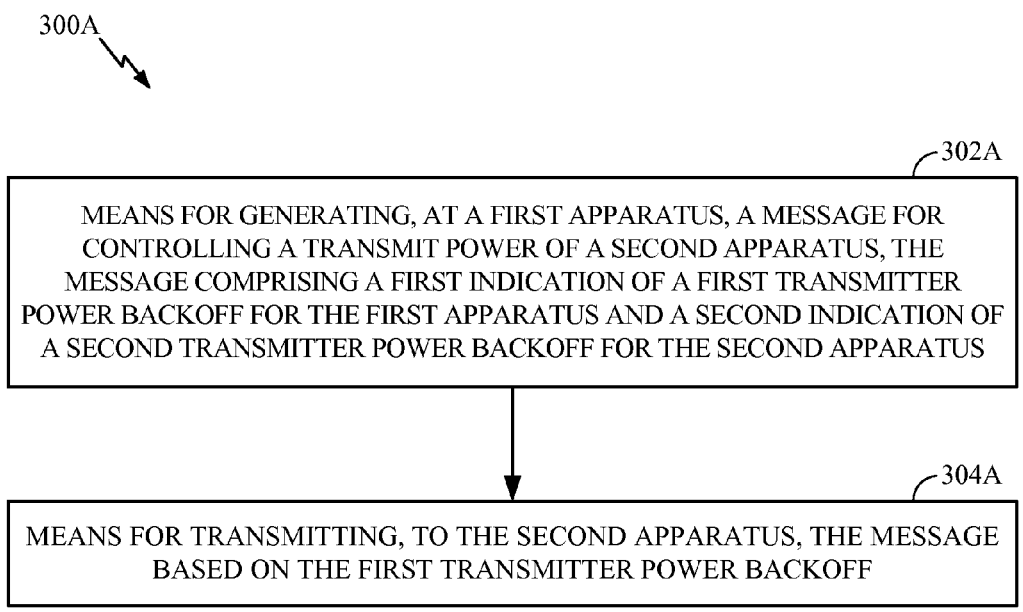
FIG. 3A illustrates example means for performing the operations shown in FIG. 3.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 300 illustrated in FIG. 3 correspond to means 300A illustrated in FIG. 3A.

For example, means for transmitting may comprise a transmitter, such as the transmitter unit 222 of the access point 110 illustrated in FIG. 2 or the transmitter unit 254 of the user terminal 120 depicted in FIG. 2. Means for receiving may comprise a receiver, such as the receiver unit 222 of the access point 110 or the receiver unit 254 of the user terminal 120 depicted in FIG. 2. Means for processing, means for determining, or means for generating may comprise a processing system, which may include one or more processors, such as the RX data processor 270, the TX data processor 288, and/or the controller 280 of the user terminal 120 or the RX data processor 242, the TX data processor 210, and/or the controller 230 of the access point 110 illustrated in FIG. 2.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A first apparatus for wireless communications, comprising:
   a processing system configured to generate a message for controlling a transmit power of a second apparatus, the message comprising:
   a first transmit power backoff for the first apparatus; and
   a second transmit power backoff for the second apparatus; and
   a transmitter coupled to the processing system and configured to transmit, to the second apparatus, the message based on the first transmit power backoff.

2. A method for wireless communications, comprising:
   generating, at a first apparatus, a message for controlling a transmit power of a second apparatus, the message comprising:
   a first transmit power backoff for the first apparatus; and
   a second transmit power backoff for the second apparatus; and
   transmitting, to the second apparatus, the message based on the first transmit power backoff.

3. The method of claim 2, wherein at least one of the first apparatus or the second apparatus comprises a television band device (TVBD) operating in the television white space (TVWS).

4. The method of claim 2, wherein the first transmit power backoff comprises a current transmit power backoff for the first apparatus.

5. The method of claim 2, wherein the second transmit power backoff comprises a suggested transmit power backoff for the second apparatus.

6. The method of claim 2, wherein at least one of the first or the second transmit power backoff is 0 for a first transmission to the second apparatus.

7. The method of claim 2, further comprising:
   receiving a second message for controlling the transmit power of the first apparatus, the second message comprising:
   a third transmit power backoff for the second apparatus; and
   the first transmit power backoff for the first apparatus; and
   determining the second transmit power backoff for the second apparatus based on the third transmit power backoff.

8. The method of claim 7, wherein determining the second transmit power backoff comprises:
   determining a power of the received second message ($P_{received}$) and a noise floor (NoiseFloor) for the second apparatus; and
   calculating the second transmit power backoff ($B_{new}$) as $B_{new} = P_{received} - (\text{NoiseFloor} + SNR_{target}) + B_{current}$, wherein $SNR_{target}$ is a target signal-to-noise ratio for the wireless communications and $B_{current}$ is the third transmit power backoff.

9. The method of claim 2, wherein the message comprises a high throughput (HT) control field.

10. The method of claim 9, wherein the first transmit power backoff and the second transmit power backoff are each indicated by one byte in the HT control field.

11. The method of claim 2, further comprising transmitting a high throughput (HT) control field, wherein transmitting the message comprises transmitting the message immediately after the transmitted HT control field.

12. The method of claim 11, wherein an indication in the HT control field indicates that the message is transmitted immediately after the transmitted HT control field.

13. A first apparatus for wireless communications, comprising:
means for generating a message for controlling a transmit power of a second apparatus, the message comprising:
a first transmit power backoff for the first apparatus; and
a second transmit power backoff for the second apparatus; and
means for transmitting, to the second apparatus, the message based on the first transmit power backoff.

14. The first apparatus of claim 1, wherein at least one of the first apparatus or the second apparatus comprises a television band device (TVBD) operating in the television white space (TVWS).

15. The first apparatus of claim 1, wherein the first transmit power backoff comprises a current transmit power backoff for the first apparatus.

16. The first apparatus of claim 1, wherein the second transmit power backoff comprises a suggested transmit power backoff for the second apparatus.

17. The first apparatus of claim 1, wherein at least one of the first or the second transmit power backoff is 0 for a first transmission to the second apparatus.

18. The first apparatus of claim 1, further comprising:
a receiver coupled to the processing system and configured to receive a second message for controlling the transmit power of the first apparatus, the second message comprising:
a third transmit power backoff for the second apparatus; and
the first transmit power backoff for the first apparatus; and
wherein the processing system is further configured to determine the second transmit power backoff for the second apparatus based on the third transmit power backoff.

19. The first apparatus of claim 18, wherein the processing system is further configured to:
determine a power of the received second message ($P_{received}$) and a noise floor (NoiseFloor) for the second apparatus; and
calculate the second transmit power backoff ($B_{new}$) as $B_{new} = P_{received} - (NoiseFloor + SNR_{target}) + B_{current}$, wherein $SNR_{target}$ is a target signal-to-noise ratio for the wireless communications and $B_{current}$ is the third transmit power backoff.

20. The first apparatus of claim 1, wherein the message comprises a high throughput (HT) control field.

21. The first apparatus of claim 20, wherein the first transmit power backoff and the second transmit power backoff are each indicated by one byte in the HT control field.

22. The first apparatus of claim 1, wherein the transmitter is configured to transmit a high throughput (HT) control field and to transmit the message immediately after the transmitted HT control field.

23. The first apparatus of claim 22, wherein an indication in the HT control field indicates that the message is transmitted immediately after the transmitted HT control field.

24. A computer-program product for wireless communications, comprising a non-transitory computer-readable medium comprising instructions executable to:
generate, at a first apparatus, a message for controlling a transmit power of a second apparatus, the message comprising:
a first transmit power backoff for the first apparatus; and
a second transmit power backoff for the second apparatus; and
transmit, to the second apparatus, the message based on the first transmit power backoff.

25. The apparatus of claim 1, wherein the processing system comprises one or more processors, machine-readable media, and a bus interface.

* * * * *